No. 673,013. Patented Apr. 30, 1901.
W. A. M. BORRESEN.
WAVE GOVERNOR FOR MARINE ENGINES.
(Application filed Feb. 15, 1900. Renewed Oct. 3, 1900.)
(No Model.) 2 Sheets—Sheet 1.
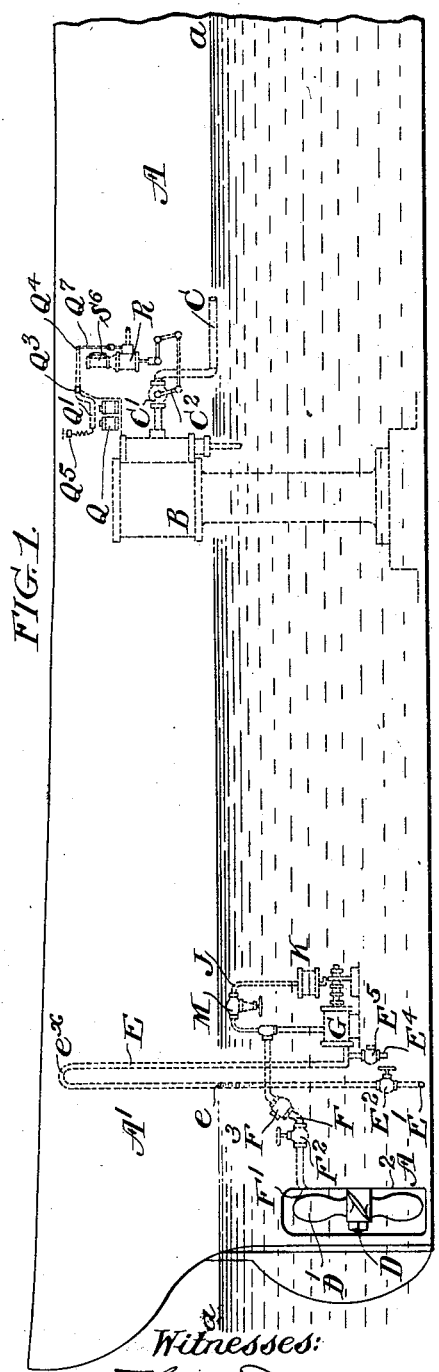
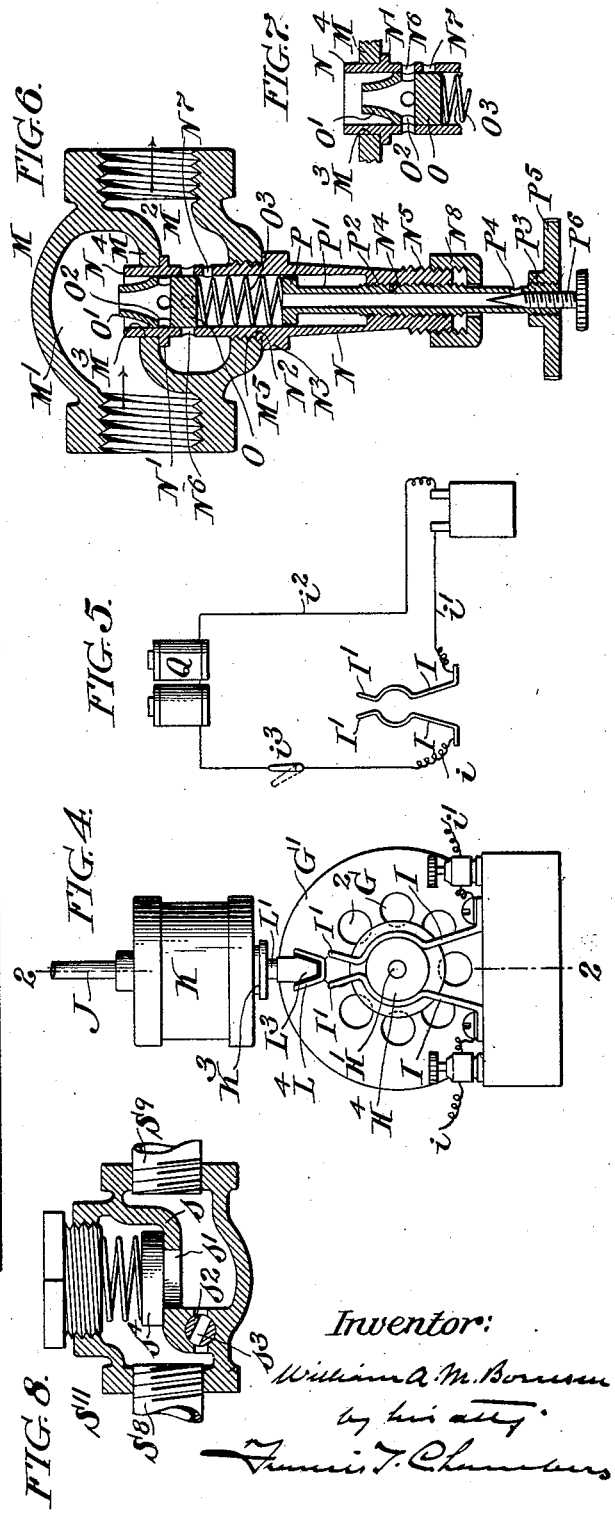

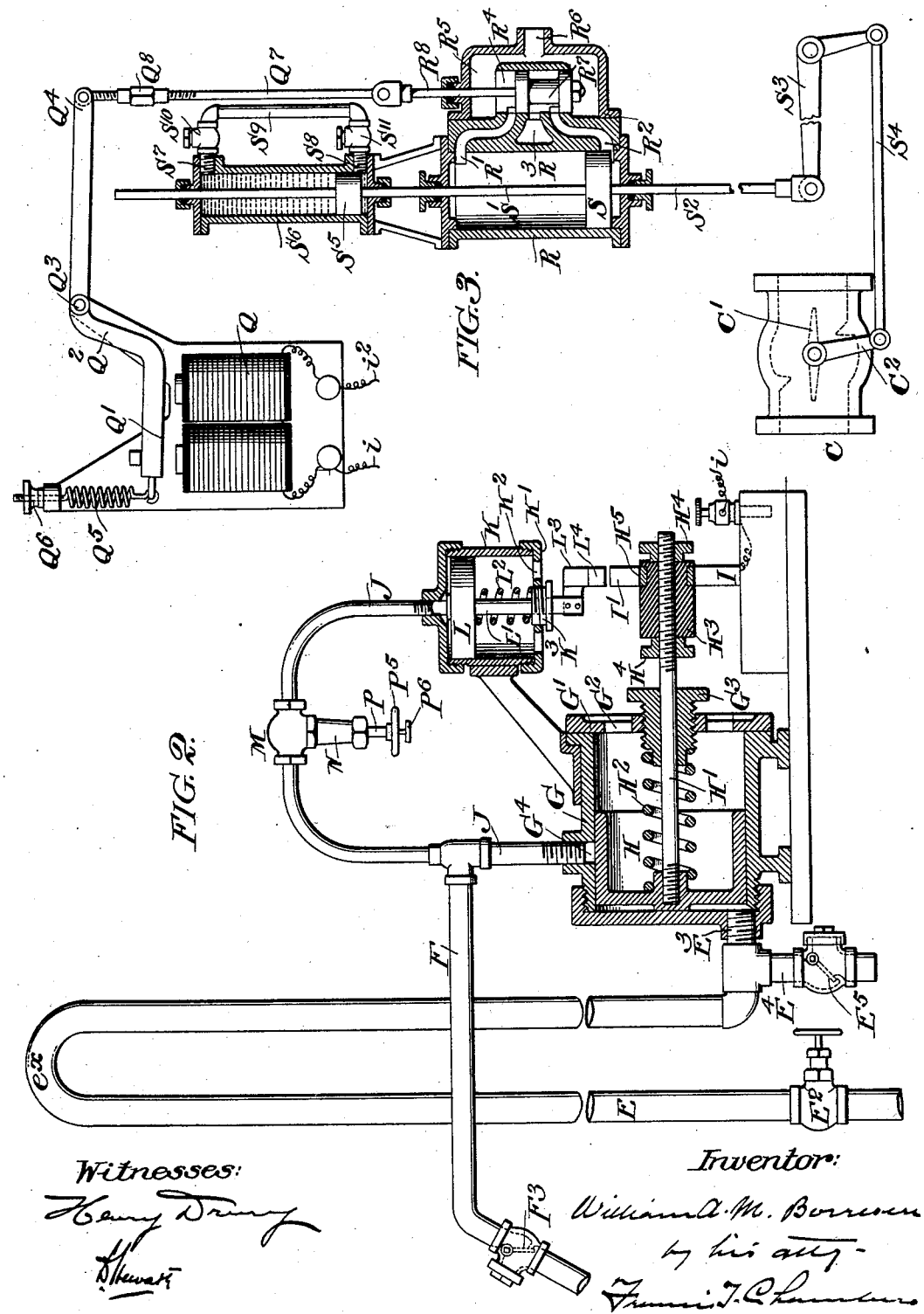

UNITED STATES PATENT OFFICE.

WILLIAM A. M. BORRESEN, OF PHILADELPHIA, PENNSYLVANIA, ASSIGNOR TO HIMSELF, SWEN PULSON, AND LAWRENCE JOHNSON, OF SAME PLACE.

WAVE-GOVERNOR FOR MARINE ENGINES.

SPECIFICATION forming part of Letters Patent No. 673,013, dated April 30, 1901.

Application filed February 15, 1900. Renewed October 3, 1900. Serial No. 31,879. (No model.)

*To all whom it may concern:*

Be it known that I, WILLIAM A. M. BORRESEN, a subject of the King of Denmark, residing in the city and county of Philadelphia, in the State of Pennsylvania, have invented a certain new and useful Improvement in Wave-Governors for Marine Engines, of which the following is a true and exact description, reference being had to the accompanying drawings, which form a part thereof.

My invention relates to governors of the class used to prevent the racing of the engines on shipboard owing to the propeller becoming uncovered or partially so by the relative fall of the water at the stern of the ship. I speak of the relative fall of the water because the contingency referred to may take place either by the rising of the stern of the ship or by the fall of the water from the stern of the ship, and, in fact, it usually occurs by reason of the simultaneous rise of the stern and pitching of the ship and fall of the water on the rear side of a wave.

Many governing devices have been devices operating to close a throttle-valve when the stern of the ship rises relatively to the water and open it when the stern of the ship falls. Some of these are quite satisfactory under certain conditions; but all of them, so far as I am aware, are defective when the sea is very rough, owing largely to the irregularity in the relative motions of the ship and the water, and under such rough conditions it is generally even necessary to disconnect the governor and operate the throttle by hand.

The object of my invention is to provide a governor which will work satisfactorily under all conditions of the sea; and my invention consists, broadly speaking, in providing, in addition to a wave-governor operating as before noted to close the throttle when the ship's stern rises relatively to the water-level and open it when the ship's stern falls, the second governing device effectively operating only when the relative motion of the ship's stern and the water is excessive to close the throttle at or about the lowest position assumed by the ship's stern with reference to the water-level, whereby the engines will be checked immediately before the corresponding change in the position of the ship's stern and the water-level in which the propeller will be thrown above said water-level.

The operative construction of the apparatus for carrying my invention into effect will be best understood as described in connection with the drawings, in which I have illustrated such apparatus in what I believe to be its best and most convenient form, and in which—

Figure 1 is a side elevation indicating the position of the governing apparatus with reference to the ship's hull and the water-level. Fig. 2 is a side elevation of the important parts of my governing device, partly shown in section on the line 2 2 of Fig. 4. Fig. 3 is a similar elevation showing the apparatus actuated by the governing device proper and operating in turn upon the throttle-valve. Fig. 4 is an end elevation of the apparatus shown in Fig. 2. Fig. 5 is a diagrammatic view showing the electrical connections which I have found it convenient to employ. Fig. 6 is a sectional view of the valve shown at M in Fig. 2. Fig. 7 is a detached view of a detail shown in Fig. 6, showing a somewhat-changed position of the parts; and Fig. 8 is a sectional view indicating the character of the valves indicated in Fig. 3 at $S^{10}$ and $S^{11}$.

A indicates the hull of a steamship, A' indicating the stern and $A^2$ the space at the stern in which the propeller is situated.

$a$ $a$ indicate the normal water-line when the ship is on an even keel.

B indicates the engine actuating the propeller, C the steam-pipe, and C' the throttle-valve situated in the steam-pipe and connected directly by means of a lever-arm $C^2$.

D indicates the end of the propeller-shaft, and D' the propeller.

E is a pipe situated in the stern of the ship and opening through the bottom thereof, as indicated at E', $E^2$ being a stop-cock by which access of water to the pipe E can be cut off when desired. The pipe E is preferably of the U shape shown, the top of the U (indicated at $e^x$) being a considerable distance above the normal water-line. It will readily be understood that the column of water in the pipe E will rise or fall approximately with the variation of the water-line to the stern of the ship and that the top of this column of water (indicated at $e$) will serve as a piston, rising and falling in the pipe E, compressing air in said pipe as it rises and relaxing said pressure as it falls. The air branch of the pipe E is connected at $E^3$ with a pneumatic cylinder G, and it is also provided with an air-entrance passage (indicated at $E^4$) and provided with a non-return valve $E^5$, said valve preventing the passage of compressed air out of the pipe E except into the pneumatic cylinder, but opening freely to admit air to the pipe E whenever the pressure therein falls below that of the atmosphere.

G is a pneumatic actuating device, preferably a cylinder, as shown, which for convenience is made with an outer head $G'$, having a central threaded perforation to receive the adjusting-screw $G^3$, which also serves as a bearing for the piston-rod, the head $G'$ having also a series of openings or perforations $G^2$, through which air can flow either from or to the end of the cylinder. A port $G^4$ is formed through the sides of the cylinder G in position to be closed by the piston when in its rearmost position and opened when the piston is thrust forward to the end of its stroke.

H indicates the piston, working in the cylinder G, $H'$ the piston-rod, and $H^2$ a spring situated between the adjusting-screw $G^3$ and the piston and serving to thrust the piston back into the cylinder with a pressure which can be nicely regulated by means of the screw $G^3$.

$H^3$ is a cylindrical block of non-conducting material adjustably secured on the outer threaded end of the piston-rod $H'$ by means of adjusting-screws $H^4 H^4$.

$H^5$ is a contact-ring, of copper or other material having electric conductivity, which is secured in or to the non-conducting cylinder $H^3$.

J is an air conduit or pipe leading from the port $G^4$ of the cylinder G to a second pneumatic actuating device—as shown, the cylinder K. The pipe J is also connected with the pipe F, which leads to the stern of the ship, opening at a point below, but considerably closer to the normal water-line than the opening of the pipe E, the opening being shown in Fig. 1 at $F'$.

$F^2$ is a stop-cock by which the pipe F can be permanently closed at will, and $F^3$ is a non-return valve in the pipe F, arranged so as to permit a free flow of air outward, but to close and entirely prevent any flow of air inward. The actuating-cylinder K, already mentioned, is, as shown, provided with a head $K'$, having openings $K^2$ and supporting an adjusting-nut $K^3$. A piston L works in the cylinder K, having attached to it a piston-rod $L'$, which passes through the nut $K^3$, and has attached to its end a wedge-like terminal, to which, but separated therefrom by non-conducting material, is attached a copper plate, (indicated at $L^4$.)

$L^2$ indicates a spring serving to force the piston L back to the rear of the cylinder, the pressure being regulated by the adjusting-nut $K^3$.

M is a valve seated in the pipe J and having, as shown, a double function—first, that of preventing the passage of air into the cylinder K below a certain regulable determined pressure and of cutting off a return flow of air from the cylinder K, and, second, the function of permitting a gradual and regulable exit of air from the cylinder K after the valve has cut off the connection through the pipe J.

As shown in Figs. 6 and 7, the valve M consists of a casing divided into two chambers $M'$ and $M^2$ by a partition $M^4$, which is formed with a cylindrical opening $M^3$, a threaded opening $M^5$ being formed through the outer wall of the casing in line with the opening $M^3$.

N is a hollow cylinder screwing into the opening $M^5$, as indicated at $N^2$, the upper end of the cylinder passing through the opening $M^3$ and annular shoulders $N'$ and $N^3$, resting, respectively, against the partition $M^4$ and against the outer wall of the casing M. The lower end of the cylinder N is formed into a head having through its center a threaded perforation $N^4$ and at its end an exterior thread $N^5$. The upper end of the cylinder N opens freely into the chamber $M'$, and it is also in communication with the chamber $M^2$ through a series of perforations $N^6$, arranged in one plane, and another perforation or perforations $N^7$ in a lower plane.

$N^8$ indicates a stuffing-box gland, screwing on the threaded end $N^5$.

O is a piston fitting in the cylinder N and movable from the position indicated in Fig. 6 to the position indicated in Fig. 7. In its upper position it closes the perforations $N^6$ and permits free communication between the chamber $M^2$ and the cylinder N through the perforation $N^7$. In its lower position (shown in Fig. 7) it closes the perforation $N^7$ and permits free communication between the chambers $M^2$ and $M'$ through the perforations $N^6$ and the upper end of the cylinder N. As shown, a hollow cone-like structure $O'$ rises from the top of the piston O, having an opening in its top and lateral openings $O^2$, which in the lower position of the plunger register with the perforations $N^6$.

$O^3$ is a spring acting to press the piston O upward to the position shown in Fig. 6. It is supported at its lower end on a plunger P, supported on and having a perforation registering with a hollow spindle $P'$, threaded at $P^2$, so as to screw into the threaded perforation $N^4$ in the head of the cylinder N, the end of the spindle $P'$ being internally threaded, as indicated at $P^3$, and having a lateral perforation, (indicated at $P^4$.)

$P^5$ is a hand-wheel secured to the end of the spindle $P'$, by which it is turned to adjust the spring-pressure acting on the piston O, and $P^6$ is a needle-valve screwing into the perforation P³ and serving to regulate the air-escape orifice P⁴.

I I (see Figs. 2, 4, and 5) are spring contact-fingers pressing on opposite sides against the block H³ or the conducting-ring H⁵. In accordance with the position of the block these fingers are in direct line with the wedge L³ L⁴ and have their upper ends, as indicated at I' I', spread outward, so as to be readily engaged by the wedge, which of course when in contact with them places them in electrical connection irrespective of their contact with the ring H⁵ by means of circuit-wires, as indicated at $i$ $i'$ $i^2$. The spring contact-fingers I I are included in a circuit embracing a battery, as shown in Fig. 5, and an electromagnet Q, $i^3$ indicating a switch, and it will be obvious that the circuit will be closed whenever the fingers I are in contact with the ring H⁵ or with the copper strip L⁴ on the wedge L³.

Referring to Fig. 3, the electromagnet Q operates upon an armature Q', secured to or forming one end of a lever Q², pivoted at Q³ and connected through its opposite arm Q⁴ with a valve-actuating rod Q⁷, having, preferably, an adjusting-sleeve Q⁸. The armature-arm Q' of the lever is normally held away from the magnet Q by the action of a spring Q⁵, adjustable by means of a screw Q⁶.

R is a cylinder having ports R' and R² at its opposite ends, and, as shown, an exhaust-opening R³, the ports and exhaust-opening opening into an open-ended cylinder R⁴ and a steam-box R⁵, connected with a steam-pipe R⁶, a piston-valve R⁷ moving in the cylinder R⁴ to connect the ports R' and R² alternately with the steam-box and with the exhaust-passage, the valve-stem R⁸ being connected with rod Q⁷.

S is a piston working in the cylinder R, having a piston-rod S' extending upward and piston-rod S² extending downward, said last-mentioned rod connecting, through a bell-crank lever S³ and a rod S⁴, with the throttle-valve lever C². The upper rod S' has attached to it a piston S⁵, working in a cylinder S⁶, having ports S⁷ and S⁸ at top and bottom, said ports being connected by a conduit S⁹, in which are preferably placed valves S¹⁰ and S¹¹, a convenient construction of which is shown in Fig. 8. The purpose of these valves is to offer a regulable resistance to the passage of fluid from the cylinder S⁶, while at the same time they open freely to permit the entrance of fluid to the cylinder. As shown in Fig. 8, the casing is divided by a partition $s$, having a port $s'$, closed by a valve $s^4$, which opens freely to permit the entrance of fluid into the casing. The partition $s$ has also in it an opening $s^3$, regulated as by means of a cock $s^3$, through which the fluid passes when forced out of the cylinder. The function of the cylinder is simply to serve as a dash-pot or regulator to prevent unduly-rapid motion of the piston S, and by means of the two valves the oil with which the cylinder S⁶ and its connecting-pipe S⁹ are filled can be made to pass with any desired resistance in either direction.

Referring now to the operation of the apparatus, I have already described that whenever the water-level rises with reference to the stern of the ship air is compressed in the pipe E, while, on the other hand, any fall of the water-level diminishes the pressure, a fall below atmospheric pressure causing an inflow of air through the opening E⁴. In practice I adjust the tension of the spring H², acting on the piston H, so that said piston will move outward in the cylinder G whenever the pressure in the pipe E exceeds a pound and a half over that of atmospheric pressure, and this outward stroke of the piston, which always takes place either when the stern of the ship is falling or the wave is rising at the stern, is arranged so as to open the throttle-valve C', which is proper, because under the conditions mentioned the propeller is moving toward the water and will be submerged before the engines have an opportunity to acquire any dangerous speed. In the connection shown, which is only one of many which will suggest themselves to those skilled in the art, the throttle-valve is opened by the movement of the ring H⁵, which with the outward stroke of the piston H leaves contact with the fingers I I, cutting off the supply of electricity to the magnet Q and permitting the spring Q⁵ to raise the arm Q' of the lever, correspondingly depressing the arm Q⁴, and through it pushing the valve R⁷ to the position shown in Fig. 3, which causes the piston S to move down to the bottom of the cylinder R and through the connections described to open the throttle-valve C². After acting upon the piston H and thrusting it outward, as described, with the result of opening the throttle-valve, the air from the pipe E passes through the cylinder G and through its lateral port G⁴ into the pipe J, but does not at once pass into the cylinder K, because the valve-piston O is held to its upper position (indicated in Fig. 6) by a pressure greater than that necessary to move the piston H, and which in practice I have found it advisable to adjust at about three and a half pounds. If, however, the open end F' of the pipe F is still above the water-line, the air passing into the pipe J escapes freely through the said pipe F, and therefore no pressure accumulates in the pipe J until after the end of the pipe F is submerged by a continued downward movement of the ship's stern with reference to the surface of the water. After this occurs the pressure accumulates in the pipe J, and if the downward movement of the ship's stern continues sufficiently long said pressure finally becomes sufficient to press downward the piston-valve O to the position shown in Fig. 7, permitting the air to enter the cylinder K and to press downward the piston L, which, pressing the conducting-wedge L⁴ into contact with the spring-fingers I I, closes the circuit through the electromagnet Q, causing it to act upon the armature and through it and the connections described to draw the valve R⁷ upward, so as to permit the entrance of steam through the port R² of the cylinder R, whereupon the piston S will move upward, closing the throttle-valve C². This closure of the valve will occur practically at the bottom of an unusually deep downward movement of the stern with reference to the surface of the water, and this is the proper time for closing the throttle under such circumstances, because such unusually deep downward movement is immediately followed by a correspondingly high upward movement, and the steam should be shut off before the propeller leaves the water. After the completion of the downward movement of the ship's stern with reference to the surface of the water an upward movement immediately begins with a corresponding diminution in pressure in the pipe E. This fall in pressure permits the piston H to move backward quite promptly, bringing the contact-ring H⁵ into position to close the circuit, and in case the supplemental governing-cylinder K is operated the said ring H⁵ is moved to circuit-closing position before the circuit-closing wedge I⁴ leaves contact with the fingers I I, because as the pressure falls in the conduit J J during the upward movement of the ship's stern the piston-valve O immediately closes to the position shown in Fig. 6, preventing the escape of air from the cylinder K into the chamber M', but opening an escape-passage through the perforation N⁷, the cylinder N, the perforated stem P', and the opening P⁴, which is regulated by the needle-valve P⁶ to any desired degree of rapidity, provision being thus easily made for maintaining the circuit closed while the piston H and the contact-ring H⁵, moving with it, are moving back to the position shown in Fig. 2. At the same time the escape of the air from the cylinder K is sufficiently rapid to insure the return of the piston L to its normal position before the ship's stern again moves downward.

It will be obvious that my apparatus as illustrated is capable of considerable modification without departure from the spirit of my invention, and I therofore wish to be clearly understood as not limiting myself on any details of construction, except where such details of construction are specifically referred to as limitations in the claims.

Having now described my invention, what I claim as new, and desire to secure by Letters Patent, is—

1. A marine wave-governor having in combination with the throttle-valve of the engine and an air-chamber as described and in which the air is compressed or allowed to expand as the stern of the ship falls or rises with reference to the surface of the water, mechanism actuated by the air in said chamber and acting on the throttle as described to close it during the expansion of the air and open it during the compression thereof and a second and less sensitive mechanism also actuated by the air in the chamber aforesaid and acting on the throttle as described and only when the compression is excessive, said second mechanism acting to close the throttle during the compression of the air.

2. A marine wave-governor comprising a conduit, as E, opening below the water-level at or near the stern of a ship and extending above said level wherein air is compressed by the relative rise of the wave to the ship's stern and relieved in pressure by the relative fall of the wave, in combination with a pneumatic throttle-valve-actuating device connected to the air-conduit and arranged to open the valve when the air in the conduit is compressed to a determined degree, a second pneumatic valve-actuating device arranged to close the throttle when under the influence of compressed air and to operate only under a higher pressure than that required to operate the first actuating device, means for admitting air from pipe E to said second actuating device actuated to open after the throttle is opened by the first actuating device and to close after the first device is relieved of pressure, and means for independently exhausting the air acting on the second throttle-valve-actuating device.

3. A marine wave-governor comprising a conduit, as E, opening below the water-level at or near the stern of a ship and extending above said level wherein air is compressed by the relative rise of the wave to the ship's stern and relieved in pressure by the relative fall of the wave, in combination with a pneumatic throttle-valve-actuating cylinder G having a piston operating to open the valve when the pressure rises and close it when the pressure falls, said cylinder having also a port, as G⁴, opened when the piston moves to open the throttle, a second pneumatic cylinder, as K, having a piston operating to close the throttle when under the influence of compressed air of determined pressure, a conduit J, coupling the port G⁴ of cylinder G with cylinder K, an air-escape pipe F leading from conduit J to a point at the stern of the ship below the normal water-level but above the opening of conduit E, a non-return valve in conduit F, and means for gradually exhausting air from cylinder K independent of the port G⁴ and conduit F.

4. A marine wave-governor comprising a conduit, as E, opening below the water-level at or near the stern of a ship and extending above said level wherein air is compressed by the relative rise of the wave to the ship's stern and relieved in pressure by the relative fall of the wave, in combination with a pneumatic throttle-valve-actuating cylinder G having a piston operating to open the valve when the pressure rises and close it when the pressure falls, said cylinder having also a port, as G⁴, opened when the piston moves to open the throttle, a second pneumatic cylinder, as K, having a piston operating to close the throttle when under the influence of compressed air of determined pressure, a conduit J, coupling the port G⁴ of cylinder G with cylinder K, an air-escape pipe F leading from conduit J to a point at the stern of the ship below the normal water-level but above the opening of conduit E, a non-return valve in conduit F, an air-admission passage E⁴, having a non-return valve connected to the conduit E and means for gradually exhausting air from cylinder K independent of the port G⁴ and conduit F.

5. A marine wave-governor comprising a conduit, as E, opening below the water-level at or near the stern of a ship and extending above said level wherein air is compressed by the relative rise of the wave to the ship's stern and relieved in pressure by the relative fall of the wave, in combination with a pneumatic throttle-valve-actuating cylinder G having a piston operating to open the valve when the pressure rises and close it when the pressure falls, said cylinder having also a port, as G⁴, opened when the piston moves to open the throttle, a second pneumatic cylinder, as K, having a piston operating to close the throttle when under the influence of compressed air, a conduit J, coupling the port G⁴ of cylinder G with cylinder K, an air-escape pipe leading from conduit J to a point at the stern of the ship below the normal water-level but above the opening of conduit E, a non-return valve in conduit F, an air-admission passage E⁴, having a non-return valve connected to the conduit E, a non-return valve in conduit J adapted to admit air to cylinder K only after it exceeds a determined pressure, and means for gradually exhausting the air from cylinder K.

6. In a marine wave-governor, substantially as described, comprising a pneumatic conduit E, the cylinder G coupled thereto, the cylinder K intermittently coupled to the conduit E through the cylinder G by conduit J, the air-admission passage E⁴ and the air-exhaust conduit F, the combination of the conduit J of the valve M opening under determined pressure and closing against the return of air and having a regulable air-escape passage opening when the valve is closed.

WILLIAM A. M. BORRESEN.

Witnesses:
   CHAS. F. MYERS,
   D. STEWART.